United States Patent [19]
Toji

[11] Patent Number: 5,573,460
[45] Date of Patent: Nov. 12, 1996

[54] TORSIONAL VIBRATION DAMPENING DEVICE HAVING MULTIPLE DAMPENING FORCE LEVELS WITH TRANSITIONAL DAMPENING MEANS BETWEEN MULTIPLE DAMPENING FORCE LEVELS

[75] Inventor: Mitsuo Toji, Neyagawa, Japan

[73] Assignee: Kabushiki Kaisha Daikin Seisakusho, Osaka, Japan

[21] Appl. No.: 318,941

[22] Filed: Oct. 6, 1994

[30] Foreign Application Priority Data

Oct. 13, 1993 [JP] Japan ...................... 5-255427

[51] Int. Cl.$^6$ ............................................. F16D 3/12
[52] U.S. Cl. .................................... 464/24; 464/68
[58] Field of Search .......................... 464/24, 66, 68; 192/272, 211, 208, 55.4; 74/574

[56] References Cited

U.S. PATENT DOCUMENTS

| | | | |
|---|---|---|---|
| 4,148,200 | 4/1979 | Schallhorn et al. | 464/66 X |
| 4,873,887 | 10/1989 | Andra et al. | 464/24 X |
| 5,048,658 | 9/1991 | Reik | 464/24 X |
| 5,052,978 | 1/1991 | Hanke | 464/24 |
| 5,180,044 | 1/1993 | Fukusima et al. | 464/66 X |
| 5,269,198 | 12/1993 | Fukushima | 192/208 X |
| 5,353,664 | 10/1994 | Yamamoto | 464/68 X |
| 5,355,747 | 10/1994 | Kijitani et al. | 464/68 X |
| 5,367,921 | 11/1994 | Fukushima | 464/68 X |

FOREIGN PATENT DOCUMENTS

| | | | |
|---|---|---|---|
| 4229638 | 3/1993 | Germany . | |
| 2235963 | 3/1991 | United Kingdom | 464/24 |

*Primary Examiner*—Daniel P. Stodola
*Assistant Examiner*—Eileen A. Dunn
*Attorney, Agent, or Firm*—Shinjyu Office of Patent Attorney

[57] ABSTRACT

Viscous resistance generation mechanism (71) is a device that dampens torsional vibrations using the restricted flow of a viscous fluid. The mechanism is installed in a flywheel assembly having a first flywheel and a second flywheel coupled to allow for limited relative rotary displacement. The viscous resistance generation mechanism (71) is equipped with a first choke (S1) that generates a resistive force through the passage of a viscous fluid between small chambers formed on either side of the choke (S1) in response to rotary displacement between the flywheels in a first angular displacement range. A second choke (S2) produces a resistive force in a second displacement range greater than the first displacement range, the resistive force of the second choke (S2) being larger than the resistive force produced by the first choke (S1). A transitional damper assembly (50) does not function in the first angular displacement range, but does in the second angular displacement range to lessen the effects of the transition between the resistive force the first choke (S1) and the resistive force of the second choke (S2).

13 Claims, 5 Drawing Sheets

5,573,460

TORSIONAL VIBRATION DAMPENING DEVICE HAVING MULTIPLE DAMPENING FORCE LEVELS WITH TRANSITIONAL DAMPENING MEANS BETWEEN MULTIPLE DAMPENING FORCE LEVELS

BACKGROUND OF THE INVENTION

The invention relates to a torsional vibration dampening device employed in, for instance, a split flywheel having a first and a second flywheel connected for limited angular displacement therebetween, where the dampening device absorbs vibrational energy during relative displacement of the two flywheels. In particular, the dampening device relates to a torsional vibration dampening device having multiple fluid paths, where one path, having a first choke, provides vibration dampening for small relative displacement between the two flywheels and another path, having a second choke, provides vibration dampening for larger relative displacement between the two flywheels, where each choke has differing dampening characteristics and wherein a transitional dampening device is provided to reduce the transition between the differing characteristics of the two chokes.

DESCRIPTION OF THE RELATED ART

Torsional vibration dampening devices are devices that, upon displacement of two flywheels in a split flywheel construction, allow for the flow of fluid between two cavities formed between the two flywheels and utilize the resistive force of a fluid choke to restrict viscous fluid flow between the cavities in order to dampen torsional vibrations. For example, such dampening devices are used in flywheels disposed between the engine of an automobile and the clutch assembly.

In this type of torsional vibration dampening device, it desirable to have several levels of fluid flow resistive force for effectively dampening the various vibrational conditions which may be experienced by an automotive flywheel. Namely, a small resistive force is effective for small torsional vibrations which are the source of unusual noises during idling of an engine while a large resistive force is effective for dampening low-frequency vibrations occurring when the accelerator pedal is suddenly stepped on and released (tip-in and tip-out).

Conventional torsional vibration dampening devices are equipped with a first choke that generates a small resistive force in a small torsional angle range of displacement between the first flywheel and second flywheel, and a second choke that generates a large resistive force in response to a large torsional angle displacement range between the first flywheel and second flywheel.

In the structure of conventional torsional vibration dampening devices, the resistive force in the first choke must be made as small as possible in order to absorb minute vibrations while the engine is idling. Conversely, the resistive force in the second choke must be made large in order to sufficiently absorb low-frequency vibrations. Because of this, during a transition between the operation of the first choke to the operation of the second choke in a conventional device, the resistive force changes suddenly. The characteristics or response from the sudden change in resistive force, results in a shock generated when a tip-in–tip-out of acceleration is applied. In other words, when a driver of an automobile equipped with such a device presses suddenly on the accelerator and/or suddenly releases the accelerator, a shock or jolt is felt within the automobile.

SUMMARY OF THE INVENTION

One of the purposes of this invention is to reduce the shock experienced during a sudden change in torque applied to a flywheel by gradually changing the resistive force in the dampening device of the flywheel.

The invention relates to a torsional vibration dampening device disposed between two flywheels, the flywheels coupled to one another for limited angular displacement therebetween. The first flywheel is formed with a fluid filled recess partially covered by the second flywheel. The dampening device is disposed within the recess and includes an input rotor and output rotor coupled respectively with the first and second flywheels, to allow rotation relative to one another. Within the recess, a plurality of chambers are defined by the rotors and by portions on the first flywheel such that a first choke, and a second choke are defined between adjacent chambers.

Upon angular displacement of the rotors in a first angular displacement range, viscous fluid in the recess is forced to pass from a first small chamber to a second adjacent small chamber. The fluid passes through the first choke, the first choke providing a first resistive force due to the passage of the viscous fluid. Upon angular displacement of the rotors in an angular displacement range greater than the first range, fluid is forced to pass from a first large chamber to a second adjacent large chamber, the fluid passing through a second choke. The second choke produces a resistive force larger than the resistive force provided by the first choke.

Further, a transitional dampening assembly is formed between the first and second large chambers that dampens the transition between the resistive force of the first choke to the resistive force of the second choke. The transitional dampening assembly, in one embodiment, includes two generally parallel bores, each provided with a spring biased piston. The pistons are arranged so that in a first fluid flow direction between chambers, a first one of the pistons moves in response to fluid movement, while the other does not. In a second fluid flow direction, the second piston moves in response to fluid movement while the first does not. In responding to fluid flow, the movement of the pistons absorbs a portion of the energy associated with the flow of fluid, thus softening the transition between the resistive forces of the two chokes.

For torsional vibration dampening devices related to this invention, the first choke functions to generate a resistive force in the first displacement angle range between the input rotor and output rotor. Further, in the second displacement angle range, the second choke functions to generate a larger resistive force. One of the pistons in the transitional dampening assembly is closed in the first displacement angle range but opens within the second displacement angle range letting the viscous fluid flow to dampen the resistive force generated by the second choke.

When the transitional dampening assembly is set to open at the smallest angle of the second displacement angle range, changes in the resistive force become gradual while the displacement angle of the input rotor and output rotor transfers from the first displacement angle to the second torsion angle. Moreover, because the transitional dampening assembly is closed within the first displacement angle range, the entire resistive force within the first displacement angle range need not be lowered more than necessary.

The cross-sectional area of the bores in the transitional dampening assembly can be increased or decreased to adjust the degree of transitional dampening, depending upon the needs of the flywheel assembly design. Further, the rigidity of the elastic material or biasing spring can be changed to adjust the dampening force of the transitional dampening assembly. As a result, changes in the resistive force during the transfer from the first displacement angle range to the second displacement angle range can be optimally adjusted.

DETAILED DESCRIPTION OF THE PREFERRED EMBODIMENTS

Figure 1:
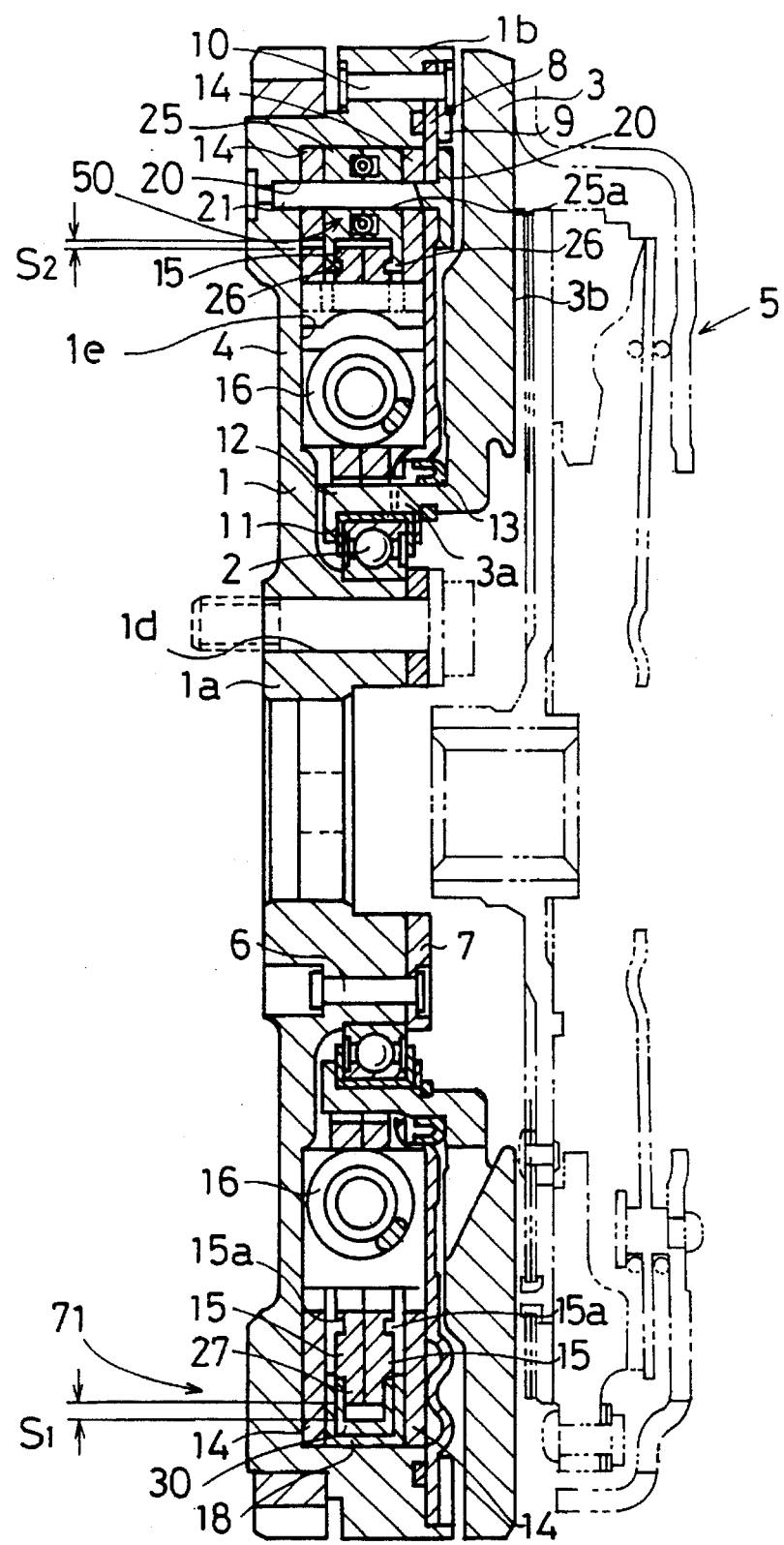
FIG. 1 is a longitudinal section showing a flywheel assembly which includes one embodiment of the dampening device of the present invention.
Figure 2:
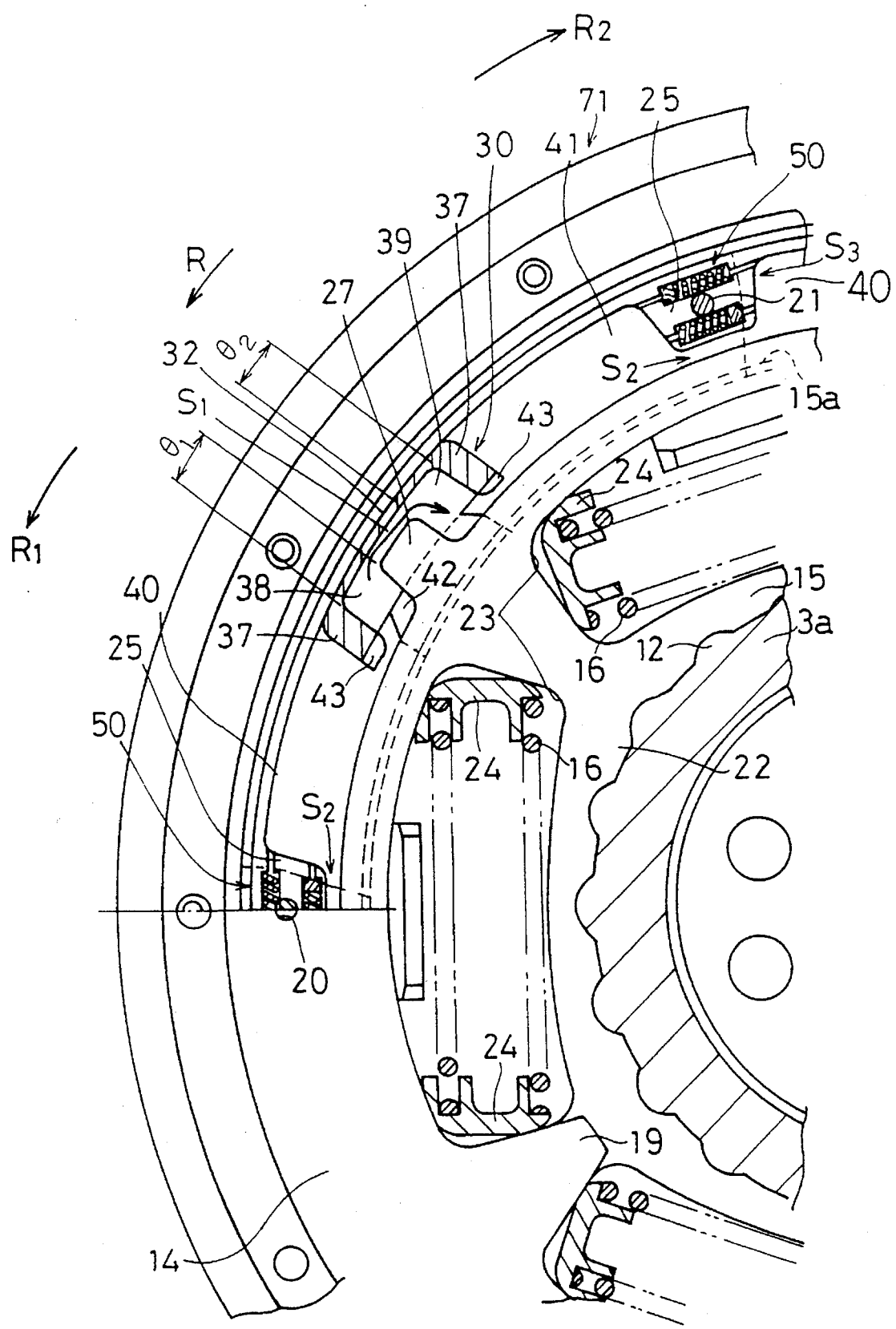
FIG. 2 is a partial side section of FIG. 1 on a slightly enlarged scale.

Various objects, features, aspects and advantages of the present invention will become more fully apparent from the following detailed description of the present invention when taken in conjunction with the accompanying drawings where like reference numerals denote corresponding parts throughout, wherein FIGS. 1 and 2 show a flywheel assembly which includes one embodiment of the present invention. The assembly includes a first flywheel (1), second flywheel (3) coupled to freely rotate via bearing (2) in the first flywheel (1). A damper mechanism (4) arranged between the first flywheel (1) and the second flywheel (3). The first flywheel (1) is fixed to the crankshaft of an internal combustion engine (not shown), while a clutch (5) is mounted on the second flywheel (3).

The first flywheel (1) has roughly a disc shape and has a boss (1a) formed at the center of the flywheel. An outer peripheral annular wall (1b) protrudes toward the second flywheel (3). All annular concave recess (1e) is formed between the boss (1a) and the outer peripheral annular wall (1b) to contain the damper mechanism (4). The bearing (2) is mounted at the outer periphery of the boss (1a). The bearing (2) is fixed to the boss by a plate (7) which is fixed by a rivet (6) to the boss (1a). The bearing (2) has a seal material on both sides that provides means for retaining a lubricating oil.

The second flywheel (3) is formed with an inner annular boss (3a). A thermal insulation (11) is arranged between the bearing (2) and the boss (3a) to insulate against heat. Thermal insulation (11) makes contact with the outer race of bearing (2) only and does not touch the inner race. A bolt (shown in phantom) extending though a hole (1d) in the boss (1a) fixes the flywheel assembly to the crankshaft (not shown).

Adjacent to the second flywheel (3), the first flywheel (1) is provided with a stopper plate (8) and sub-plate (9), arranged to retain the damper mechanism (4) within the recess (1e) of first flywheel (1). These plates (8) and (9) are fixed to the end of outer peripheral annular wall (1b) of the first flywheel (1) by rivet (10).

The second flywheel (3) is roughly a disc shape and has boss (3a) located at the center protruding toward the first flywheel (1). Further, bearing (2) is mounted at the inner peripheral of boss (3a). As shown in FIG. 2, the boss (3a) is formed with wave-like teeth (12) that engage a portion of the damper mechanism (4), as will be explained in greater detail below.

A seal (13) is arranged between the boss (3a) and a portion of the damper mechanism (4) to seal viscous fluid inside the damper mechanism (4). Further, the second flywheel (3) is formed with a friction surface (3b) which is engagable with the friction material of the clutch disk shown in phantom in FIG 2.

Damper assembly (4) is formed between the first flywheel (1), sub-plate (8) and boss assembly (3a) of the second flywheel, and is generally disposed in the recess (1e), filled with a viscous fluid. Damper assembly (4) includes a pair of drive plates (14) fastened to the first flywheel (1), a pair of driven plates (15) which rotate integrally with the second flywheel (3) and are arranged between the pair of drive plates (14), coil spring (16) flexibly coupled to both plates (14) and (15) circumferentially, and a viscous resistance generation mechanism (71) which generates a resistive force upon movement of the viscous fluid, which moves when the drive plates (14) and the driven plates (15) rotate relative to one another.

The drive plates (14) have a ring-like shape and have a plurality of protrusions (19) that extend radially inwardly, as shown in FIG. 2. A plurality of torsion coil springs (16) are disposed in the spaces defined between the protrusions (19).

A plurality of apertures (20) are formed in the drive plates (14). Securing pins (21) extend into the apertures (20) and, as shown in FIG. 1, secure a plurality of dams (25) formed within a liquid chamber housing (18) (described below), the pair of drive plates (14) and a stopper plate (8) to the pair of drive plates (14).

The driven plates (15) are ring shaped and, as shown in FIG. 2, have wave-like teeth (22) on an inner radial edge. These wave-like teeth (22) mesh with the wave-like teeth (12) formed in the second flywheel (3). This meshing causes the driven plates (15) and the second flywheel (3) to rotate integrally. A plurality of circumferentially extending windows (23) are formed in the driven plates (15). These windows (23) correspond to the spaces between the protrusions (19) adjacent to driven plates (14). One of each of the plurality of coil springs (16) are disposed in each of the windows (23).

As shown in FIG. 2, each end of the roll spring (16) is provided with a spring seat (24). The spring seats (24) makes contact each end of the windows (23) in the circumferential direction. In FIG. 2, the damper mechanism (4) is shown in a free state, where there is no angular displacement between the flywheels (1) and (3) or between the plates (14) and (15). In a free state, the outer peripheral edge of the spring sheets (24) make contact with the ends of the windows (23) and with the protrusions (19). In other words, the coil spring (16), via the spring seats (24) elastically couple the drive plates (14) and driven plates (15) circumferentially.

The outer peripheral portion of the driven plates (15) are provided with a plurality of radially protruding projections (27), positioned generally to correspond to portions of the plate (15) between the windows (23).

The viscous resistance generation mechanism (71) includes the annular liquid chamber housing (18), a slider

(30) disposed within the liquid chamber housing to move freely circumferentially and the outer peripheral assembly of the driven plates (15). The liquid chamber housing (18) is provided on an inner radial surface with a plurality of dams (25) partially define first and second arcuate fluid chambers (40) and (41), the dams (25) being shown in FIG. 2.

As shown more clearly In FIG. 1, an annular projection (26) is formed on the radial inner edge of each side of the liquid chamber housing (18). The two annular projections (26) extend into corresponding grooves (15a) formed on the driven plates (15) and seal the chambers (40) and (41). The outer radial edge of each of the driven plates (15) extend into the liquid chamber housing (18). A plurality of sliders (30), each of which resembles an open box, is open radially inwardly, each arranged inside liquid chamber housing (18) such that the protrusions (27) on the driven plates (15) extend into the sliders (30), as is shown in FIG. 2. The circumferential ends of the slider (30) define stoppers (37). The slider (30) further defines the chambers (40) and (41). On an inner radial portion of each slider (30), an opening (43) is formed which extends from the open portion of each slider (30) through each stopper (37).

When the flywheels (1) and (2) are at rest (i.e. no torque is being applied to the flywheel assembly), the stopper (37) is circumferentially separated from the protrusion (27) by angle $\theta_1$ and $\theta_2$, as is shown in FIG. 2.

The protrusions (27) of the driven plates (15) divide an inner portion of the slider (30) into a first small chamber (38) of rotating direction (R1) and a second small chamber (39) of rotating direction (R2) as well as defining the first choke (S1) which allows for fluid flow between the two chambers (38) and (39). The first choke (S1) is defined between the inner surface of the slider (30) and the surface of the protrusion (27).

A plurality of grooves (42) are formed in the housing (18) to allow fluid flow between the two chambers (38) and (39). The grooves (42) are approximately centrally formed between pairs of each dams (25) and in a torsion free state or at rest state, i.e. when the engine stops, the housing (18) is positioned such that the grooves (42) are shifted to an approximate center of the slider (30) and generally are aligned protrusions (27) of the driven plates (15).

A second choke (S2) is formed between the inner radial surface of each dam (25) and an outer radial surface of the plates (15) that allows viscous fluid to pass between the chambers (40) and (41). The first choke (S1) has a fluid path cross-sectional area larger than the second choke (S2).

Figure 3:
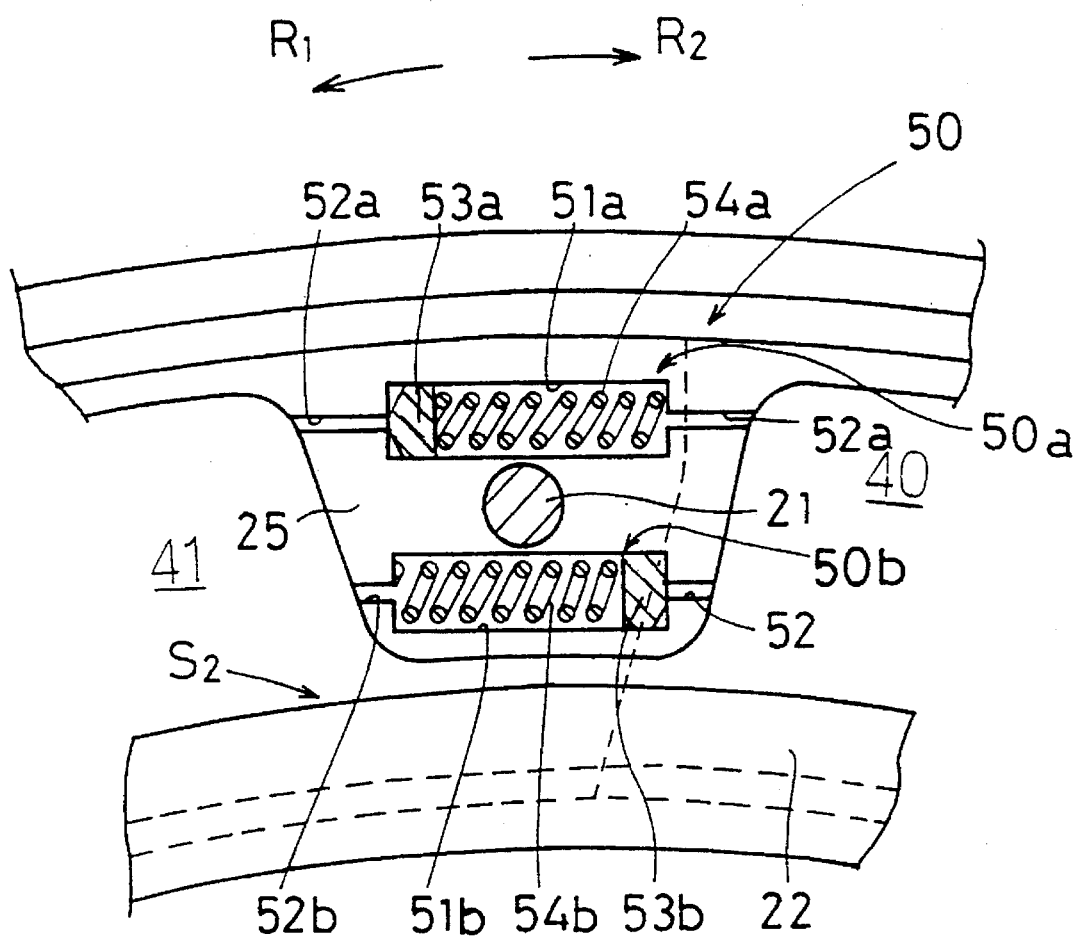
FIG. 3 is a partial section showing a portion of FIG. 2 on an enlarged scale.

A transitional dampening assembly (50) is formed in each dam (25), as is shown more clearly in FIG. 3. Two one-way fluid flow paths (50a) and (50b) are formed in each dam (25) that connect the chambers (40) and (41). Each path includes a viscous fluid containment channel (51a) and (51b), respectively, and paths (52a) and (52b) connecting the chambers (40) and (41) with the channels (51a) and (51b). The flow path cross-sectional area of the paths (52a) and (52b) are narrower than the viscous fluid containment channels (51a) and (51b).

Piston (53a) and (53b) and coil springs (54a) and (54b) are contained inside viscous fluid containment channels (51a) and (51b), respectively. Each piston (53a) and (53b) is biased against one end wall of each of the viscous fluid containment channels (51a) and (51b) by the springs (54a) and (54b) and each can move inside their respective viscous fluid containment channels (51a) and (51b) upon compression of the spring. For instance, sufficient movement of fluid from the chamber 41 into the chamber 40 can cause the spring (54a) to be compressed, allowing the piston (53a) to move and allowing fluid to flow from the chamber (41) to the chamber (40) through the channel (51a). Similarly, sufficient fluid flow from the chamber (40) to the chamber (41) can cause the spring (54b) to be compressed and allowing the piston (53b) to move allowing the flow of fluid through the channel (51b).

The piston (53a) is arranged so that rotation of the dam (25) relative to the plates 15 in rotation direction (R1) causes fluid pressure to compress the coil spring (54a), opening the path (52a) of rotation direction (R1). The piston (53b) is arranged such that relative rotation of the dam (25) in the direction (R2) causes the coil spring (54b) to open the path (52b).

Conversely, rotation of the dam (25) relative to the plates 15 in rotation direction (R2) causes the piston (53a) to close the path (52a). The piston (53b) is arranged such that relative rotation of the dam (25) in the direction (R1) causes the piston (53b) to close the path (52b).

When torque is input to the first flywheel by the crankshaft of an internal combustion engine (not shown in figure), the torque is transmitted to the second flywheel (3) via the drive plates (14), coil spring (16) and the driven plates (15). When the flywheel assembly generates torsional vibration, the drive plates (14) that rotate integrally with the first flywheel (1) and the driven plates (15) that rotate integrally with the second flywheel (3) rotate relative to each other. During this time, torsion spring (16) expands and contracts between the drive plates (14) and the driven plates (15). Further, while the chokes (S1) and (S2) formed inside the liquid chamber housing allow restricted passage the viscous fluid, viscous resistance is produced and the energy of the torsional vibration is dampened. As a result, torsional vibration transmitted to the second flywheel (3) are suppressed.

The displacing operation of damper mechanism will now be explained. When vibration or excessive torque is applied to the flywheels, several things happen. From the neutral position depleted in FIG. 2, the drive plates (14) begin to undergo angular displacement with respect to the driven plates (15) in rotation direction (R2). At this time, within a small torsion angle range, the coil spring (16) compresses in an uneven contact state. Consequently, the damper mechanism (4) exhibits a small torsional stiffness. With the drive plates (14) displacing in rotation direction (R2), the liquid chamber housing (18) and the slider (30) also move in rotation direction (R2). By these actions, at the same time the first small chamber (38) compresses, the second small chamber (39) expands and becomes larger. During this time, the liquid inside the first small chamber (38) passes through the first choke (S1) and flows into the second small chamber (39). As a result, only a slight viscous resistance generates within this torque angle range. In other words, characteristics of low stiffness and small resistance are obtained with a small torsion angle range effectively preventing unusual noises from occurring while the engine is idling.

When the torsion angle becomes larger and the stopper (37) at the rotation direction (R1) side of the slider (30) makes contact against the protrusions (27), the opening (43) will enter a closed state and the viscous liquid will stop flowing through the first choke (S1).

From this closed state, the drive plates (14) and the liquid chamber housing (18) move in rotation direction (R2) relative to the stopper (37) which closed up against the protrusion (27) and the driven plate (15). This action applies pressure to the second large chamber (41). As a result of this action, the viscous fluid inside the second large chamber

(41) passes through the second choke (S2) and then flows inside the other circular arc shaped spaces. At this point, because the flow path cross-sectional area of the second choke (S2) is smaller than the flow pathcross-sectional area of the first choke (S1), a larger resistance force generates.

When pressure is applied to the second large chamber (41), the piston (53a) on the outer periphery installed in the dampening assembly (50) moves in rotation direction (R2) while the coil spring (54a) compresses. As a result, the opening of the viscous fluid containment channel (51a) opens and the viscous fluid flows into the viscous fluid containment channel (51a). Namely, the dampening assembly (50a) functions as an accumulator reducing the pressure applied to the second choke (S2). This results in the resistive force generated by the second choke (S2) being dampened. Moreover, the viscous fluid already inside the viscous fluid containment channel (51a) is discharged from the flow path (52a). Reverse rotation in the direction (R1) causes the piston (53b) to respond in a similar fashion, and since the structure of the channel (51b) is generally the same (only in a reverse direction) no further description is necessary.

Figure 4:
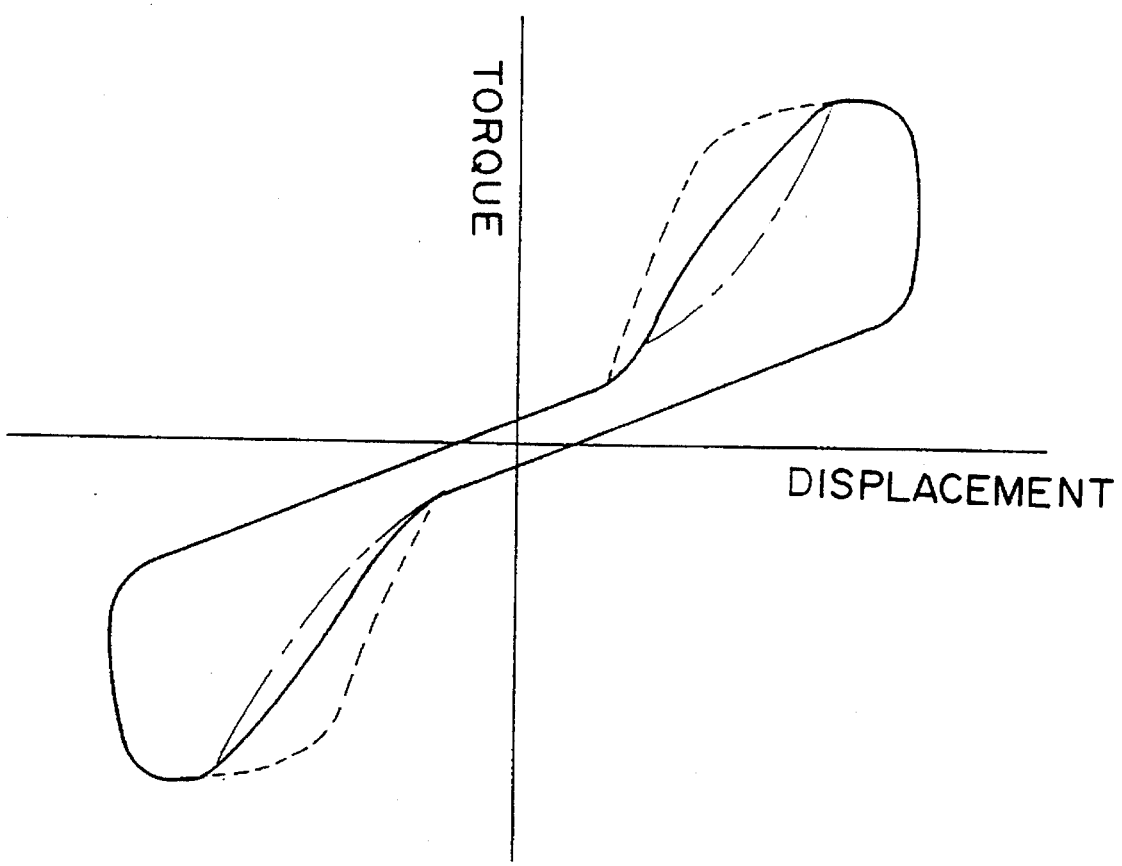
FIG. 4 is a graph of the torque vs. displacement response (the dynamic characteristics) of the damper mechanism of the present invention.

FIG. 4 shows the dynamic characteristics in the torsion characteristic curve diagram for the above damper mechanism configuration. The dotted line in the figure is for a conventional system and the solid line this invention. As can be clearly seen from the figure, in this implementation example, the moment the second choke begins functioning the dampening assembly (50) accumulates viscous fluid dampening the resistive force of the second choke (S2). Compared to the conventional example, the change in the resistive force is smooth making it difficult for shocks to occur. In the characteristics of this implementation example, the overall resistive force is reduced compared to the conventional example. Although, by narrowing the circumferential width of the slider (30) and widening the circumferential width of the protrusions (27), the reduced resistive force can be compensated for by initiating the second choke (S2) faster to make the resistive force larger. Moreover, because the dampening assembly (50) does not function in the small torsion angle range, the resistive force within a small torsion angle range need not be lowered more than necessary.

Furthermore, the dampening characteristics of the dampening assembly (50) can be changed by changing either the flow path cross-sectional area of the viscous fluid containment channel (51) or the stiffness of the coil spring (54). Namely, changes to the resistive force in the dynamic characteristics of the characteristic curve diagram can be adjusted. If the stiffness of the coil spring (54) is high or the flow path cross-sectional area of the viscous fluid containment channel (51) is small, the dampening force of the dampening assembly (50) will become small. Consequently, changes to the resistive force in the dynamic characteristics will become large. If the stiffness of the coil spring (54) is low or the flow path cross-sectional area of the viscous fluid containment channel (51) is large, the dampening force of the dampening assembly (50) will become large. Consequently, changes to the resistive force in the dynamic characteristics will become small. For instance, as shown by the dot-dash line of FIG. 4, if the stiffness of the coil spring (54) is made low, changes to the resistive force become smooth and the resistive force after the change gradually becomes larger from the small state.

Figure 5:
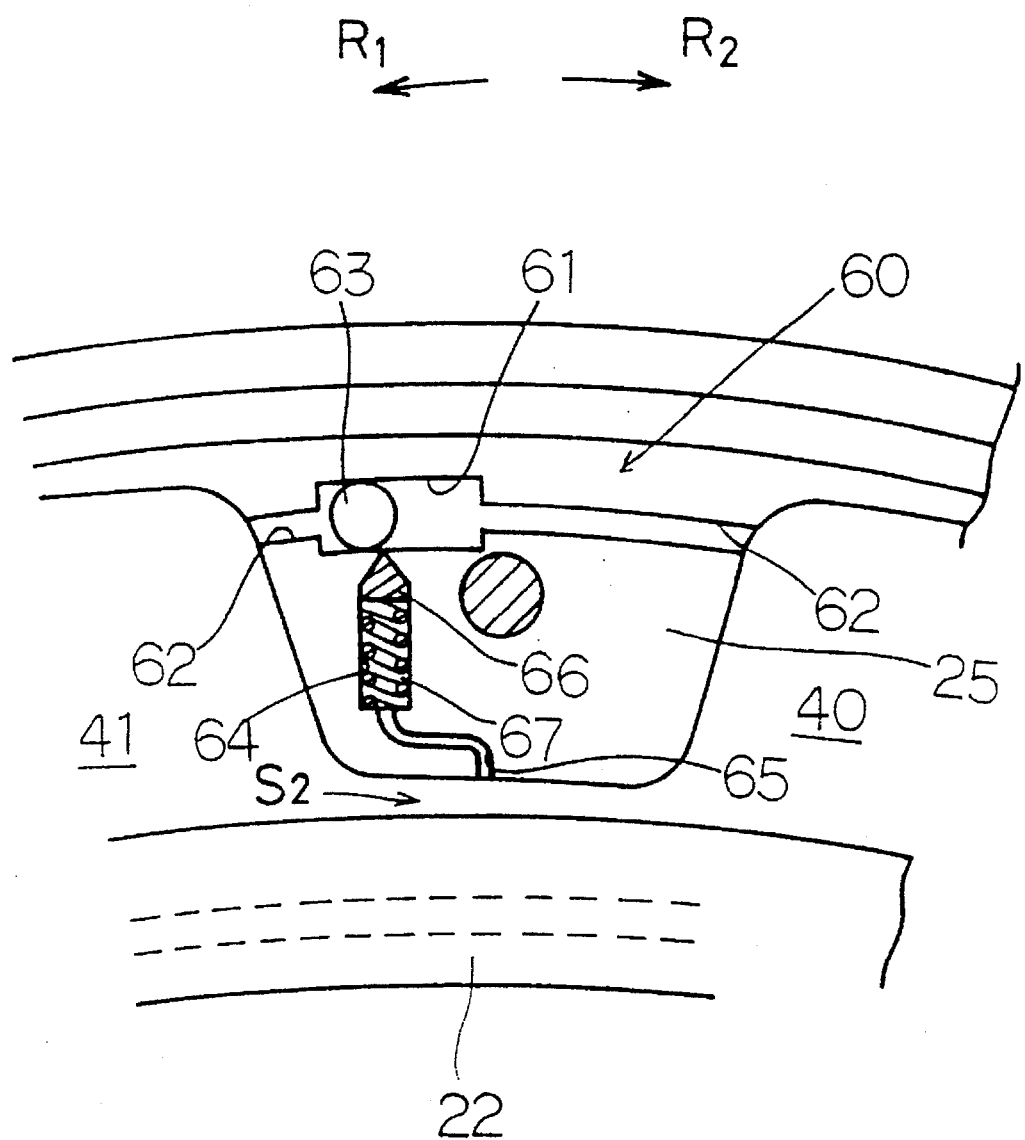
FIG. 5 is a partial section, similar to FIG. 3, depicting an alternate embodiment of the present invention.

An alternate embodiment of the viscous mechanism is shown in FIG. 5, wherein at each dam (25) is provided with an alternate damping mechanism. Inside the dam (25) is formed the first passageway (61) and the second passageway (62) through which the first passageway (61) circumferentially extends from both of its sides passing through both sides of the circular arc shaped space. The flow path cross-sectional area of the second passageway (62) is smaller than the flow path cross-sectional area of the first passageway (61). A ball (63) is disposed inside the first passageway. The ball (63) can move circumferentially inside the first passageway (61) and if it makes contact with either end of the first passageway (61), the connecting assembly for the first passageway (61) and second passageway (62) closes.

On the outer radial wall of the first passageway (61), one end of a viscous fluid containment channel (64) is formed. At the other end of the viscous fluid containment channel (64), an exhaust channel (65) that opens to the choke (S2) assembly is arranged. Inside the viscous fluid containment channel (64) a piston (66) and a coil spring (67) are disposed. The piston (66) is fastened to the inner wall of the viscous fluid containment channel (64) can move circumferentially inside the viscous fluid containment channel (64). The coil spring (67) applies force to the piston (66) at the outer radial side and the piston (66) closes the connecting assembly between the first passageway (61) and the viscous fluid containment channel (64).

When the pressure inside the second large chamber (41) increases and the pressure applied to the second passageway (62) increases, the ball (63) moves In rotation direction (R2) and the connecting assembly between the first passageway (61) and second passageway (62) closes.

Because of this, the pressure inside the first passageway (61) becomes larger and the piston (66) overcomes the force applied by the coil spring and moves radially inwardly. In this way the viscous fluid flows into the inside of the viscous fluid containment channel (64). Also, viscous fluid already inside the viscous fluid containment channel (64) is expelled from the exhaust channel (65).

By the above dampening assembly (60) functioning as an accumulator, the same results as the previous implementation example can be obtained. Moreover, by changing either the flow path cross-sectional area of the viscous fluid containment channel (64) or the stiffness of the coil spring (67), the dampening force of the dampening assembly (60) will change allowing adjustments of changes to the resistive force in the dynamic characteristics.

In the torsional vibration dampening device related to this invention, the resistive force generated by the second choke in the dampening assembly is dampened. Consequently, the transition from the first magnitude of the resistive force to the second magnitude of the resistive force is smooth making it difficult for shocks to occur.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A torsional vibration dampening device comprising:
   a first flywheel formed with an annular fluid filled recess, and a plurality of fluid filled chambers defined within said annular recess;
   a second flywheel coupled to said first flywheel for limited rotary displacement;
   a first choke defined within said annular recess allowing restricted flow of fluid between a first pair of said chambers in response to displacement of said flywheels in a first rotary displacement range;

a second choke defined within said annular recess allowing restricted flow of fluid between a second pair of said chambers in a second displacement range larger that said first displacement range, said second choke providing a fluid flow resistance greater that a fluid flow resistance of said first choke;

an annular fluid chamber housing which partially defines said annular chamber, and wherein said second pair of chambers are separated by a dam formed on an inner radial surface of said chamber housing, said dam partially defining said second choke;

a transitional dampening mechanism formed in said dam between said second pair of fluid chambers for dampening a transition between the respective resistances of said first choke and said second choke in response to displacement between said first and said second displacement ranges;

said transitional dampening mechanism comprises a first aperture and a second aperture, both of said apertures extending through said dam to each of said second pair of chambers, each of said apertures having a central chamber, said first aperture chamber having a piston and biasing spring disposed therein for movement of said piston in response to fluid flow in a first direction, said second aperture chamber having a piston and biasing spring disposed therein for movement of said piston in response to fluid flow in a second direction.

2. A torsional vibration dampening device as set forth in claim 1 further comprising:

a drive plate connected to said first flywheel for rotation therewith, said drive plate formed with a plurality of radially inwardly extending protrusions;

a driven plate connected to said second flywheel for rotation therewith, said driven plate formed with a plurality of windows; and a plurality of springs, one of said plurality of springs disposed in a corresponding one of said windows and between two adjacent ones of said protrusions, said springs elastically coupling said drive plate and said driven plate.

3. A torsional vibration dampening device as set forth in claim 2 further comprising a slider disposed in said annular fluid chamber housing, and wherein said driven plate is formed with at least one radially outwardly extending protrusion, said protrusion and an inner surface of said slider defining said first choke.

4. A torsional vibration dampening device as set forth in claim 2 wherein a radially outward circumferential surface of said driven plate and said dam define said second choke.

5. A torsional vibration dampening device comprising:

a first flywheel formed with an annular fluid filled recess, and a plurality of fluid filled chambers defined within said annular recess;

a second flywheel coupled to said first flywheel for limited rotary displacement;

a first choke defined within said annular recess allowing restricted flow of fluid between a first pair of said chambers in response to displacement of said flywheels in a first rotary displacement range;

a second choke defined within said annular recess allowing restricted flow of fluid between a second pair of said chambers in a second displacement range larger that said first displacement range, said second choke providing a fluid flow resistance greater that a fluid flow resistance of said first choke;

an annular fluid chamber housing which partially defines said annular chamber, and wherein said second pair of chambers are separated by a dam formed on an inner radial surface of said chamber housing, said dam partially defining said second choke;

a transitional dampening mechanism formed in said dam between said second pair of fluid chambers for dampening a transition between the respective resistances of said first choke and said second choke in response to displacement between said first and said second displacement ranges;

wherein said transitional dampening mechanism comprises:

said dam formed with an aperture extending therethrough to each of said second pair of chambers, said aperture having a generally central chamber having a diameter greater than that of said aperture;

a ball disposed within said aperture chamber, movable from one end of said aperture chamber to another end of said aperture chamber in response to fluid flow in and out of said aperture, an exhaust channel extending from said aperture chamber to a surface of said dam adjacent to said second choke, said exhaust channel formed with a containment channel;

a piston and spring disposed in said containment channel, said piston moveable in response to fluid flow into said aperture chamber.

6. A torsional vibration dampening device as set forth in claim 5 further comprising:

a drive plate connected to said first flywheel for rotation therewith, said drive plate formed with a plurality of radially inwardly extending protrusions;

a driven plate connected to said second flywheel for rotation therewith, said driven plate formed with a plurality of windows; and a plurality of springs, one of said plurality of springs disposed in a corresponding one of said windows and between two adjacent ones of said protrusions, said springs elastically coupling said drive plate and said driven plate.

7. A torsional vibration dampening device as set forth in claim 6 further comprising a slider disposed in said annular fluid chamber housing, and wherein said driven plate is formed with at least one radially outwardly extending protrusion, said protrusion and an inner surface of said slider defining said first choke.

8. A torsional vibration dampening device as set forth in claim 6 wherein a radially outward circumferential surface of said driven plate and said dam define said second choke.

9. A torsional vibration dampening device, comprising:

an annular fluid chamber housing which partially defines an annular chamber formed with a plurality of radially inwardly protruding dams;

a slider disposed within said annular fluid chamber housing, said slider and said dams defining at least one pair of arcuate chambers;

a driven plate disposed within said annular fluid chamber housing, said driven plate formed with at least one radially outwardly extending protrusion which extends into said slider, said protrusion defining a pair of small fluid chambers within said slider, said protrusion and said slider further defining a first choke and a circumferential surface of said driven plate and said dam defining a second choke, said first choke allowing restricted flow of fluid between said pair of small fluid chambers in response to rotary displacement between said driven plate and said annular fluid chamber housing in a first rotary displacement range, said second choke allowing restricted flow of fluid between said pair of arcuate chambers in a second displacement range, the second displacement range being larger than said first displacement range, said second choke providing a fluid flow resistance greater that a fluid flow resistance of said first choke;

a plurality of transitional dampening mechanisms, one of each of said transitional damening mechanisms formed in each of said dams, each of said transitional dampening mechanisms including a first aperture formed in each one of said dams, a piston disposed in said first aperture and a spring biasing said piston for dampening a transition between the respective resistances of said first choke and said second choke in response to displacement between said first and said second displacement ranges.

10. The torsional vibration dampening device as set forth in claim 9, wherein said transitional dampening mechanism further comprises a second aperture, both of said first and second apertures extending through said dam to each of said arcuate chambers, each of said first and second apertures having a central chamber, said first aperture central chamber having said piston and said spring disposed therein for movement of said piston in response to fluid flow in a first direction, said second aperture chamber having a second piston and a second spring disposed therein for movement of said second piston in response to fluid flow in a second direction.

11. The torsional vibration dampening device as set forth in claim 9, wherein said transitional dampening mechanism further comprises:

said dam formed with a circumferentially extending aperture extending therethrough to each of said arcuate chambers, said circumferencially extending aperture formed with a generally central chamber having a diameter greater than that of said circumferencially extending aperture;

a ball disposed within said central chamber, movable from one end of said central chamber to another end of said central chamber in response to fluid flow in and out of said circumferentially extending aperture, said first aperture extending from said central chamber to a surface of said dam adjacent to said second choke, said first aperture formed with a containment channel;

said piston and said spring disposed in said containment channel, said piston moveable in response to fluid flow into said central chamber.

12. The torsional vibration dampening device as set forth in claim 9, further comprising:

a first flywheel formed with an annular fluid filled recess, said annular fluid chamber housing being disposed in said annular fluid filled recess and fixed to said first flywheel.

13. The torsional vibration dampening device as set forth in claim 12, further comprising:

a second flywheel connected to said driven plate for limited rotary displacement with respect to said first flywheel.

\* \* \* \* \*